United States Patent
Wang et al.

(10) Patent No.: US 10,616,978 B2
(45) Date of Patent: Apr. 7, 2020

(54) LIGHTING ARRANGEMENT, COMPUTER PROGRAM PRODUCT, MOBILE COMMUNICATION DEVICE AND LIGHTING SYSTEM

(71) Applicant: SIGNIFY HOLDING B.V., Eindhoven (NL)

(72) Inventors: Wei Wang, Eindhoven (NL); Yi Zhang, Eindhoven (NL); Feng He, Eindhoven (NL); Haitao Liu, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/766,089

(22) PCT Filed: Oct. 11, 2016

(86) PCT No.: PCT/EP2016/074332
§ 371 (c)(1),
(2) Date: Apr. 5, 2018

(87) PCT Pub. No.: WO2017/064056
PCT Pub. Date: Apr. 20, 2017

(65) Prior Publication Data
US 2018/0288856 A1    Oct. 4, 2018

(30) Foreign Application Priority Data
Oct. 15, 2015    (WO) ................ PCT/CN2015/091986

(51) Int. Cl.
*H05B 37/02*    (2006.01)
*H05B 33/08*    (2020.01)

(52) U.S. Cl.
CPC ..... *H05B 37/0272* (2013.01); *H05B 33/0866* (2013.01); *H05B 33/0869* (2013.01);
(Continued)

(58) Field of Classification Search
CPC .. H05B 37/02; H05B 37/0227; H05B 33/086; H05B 33/0863; H05B 33/0869;
(Continued)

(56) References Cited

U.S. PATENT DOCUMENTS 8,934,784 B2 *  1/2015  Guo .................... H04B 10/116
                                                    398/172
2013/0141011 A1 *  6/2013  Fushimi ................ H05B 37/02
                                                    315/294
(Continued)

FOREIGN PATENT DOCUMENTS

EP    2866528 A1    4/2015

*Primary Examiner* — Wei (Victor) Y Chan
(74) *Attorney, Agent, or Firm* — Meenakshy Chakravorty

(57) ABSTRACT

Disclosed is a lighting arrangement (10) comprising a lighting device (20) having an adjustable luminous output; a control arrangement (30) communicatively coupled to the dimmable lighting device including a controller (39) adapted to adjust the luminous output of the lighting device a data storage device accessible by the controller storing calibration data for a light measurement device of a mobile communication device, the calibration data being a function of a distance between the mobile communication device and the lighting device and a communication module (31) communicatively coupled to the controller, wherein the control arrangement is adapted to control the lighting device such that the lighting device produces a predefined luminous output; receive a luminous output measurement from the mobile communication device at an unknown distance from the lighting device; retrieve distance information regarding the distance between the mobile communication device and the lighting device from the calibration data based on the received luminous output measurement; and adjust the luminous output of the lighting device with the controller in accordance with the retrieved distance information. A computer program product, mobile communication device and lighting system are also disclosed.

13 Claims, 4 Drawing Sheets

(52) U.S. Cl.
CPC ..... *H05B 37/0218* (2013.01); *H05B 37/0227* (2013.01); *Y02B 20/46* (2013.01)

(58) Field of Classification Search
CPC .............. H05B 37/0272; H05B 37/029; G01C 15/002; H04B 10/116
USPC ................ 315/294, 131, 149, 158, 291, 307
See application file for complete search history.

(56) References Cited

U.S. PATENT DOCUMENTS

| | | | |
|---|---|---|---|
| 2013/0221852 A1* | 8/2013 | Bowers | H05B 33/0863 315/131 |
| 2014/0301737 A1* | 10/2014 | Guo | H04B 10/116 398/118 |
| 2014/0327364 A1 | 11/2014 | Bischof et al. | |
| 2014/0372072 A1* | 12/2014 | Guo | H04B 10/116 702/150 |
| 2015/0377609 A1* | 12/2015 | Shen | G01B 11/14 356/4.07 |

\* cited by examiner

LIGHTING ARRANGEMENT, COMPUTER PROGRAM PRODUCT, MOBILE COMMUNICATION DEVICE AND LIGHTING SYSTEM

CROSS-REFERENCE TO PRIOR APPLICATIONS

This application is the U.S. National Phase application under 35 U.S.C. § 371 of International Application No. PCT/EP2016/074332, filed on Oct. 11, 2016, which claims the benefit of Chinese Patent Application No. PCT/CN2015/091986, filed on Oct. 15, 2015. These applications are hereby incorporated by reference herein.

FIELD OF THE INVENTION

The present invention relates to a lighting arrangement comprising a lighting device having an adjustable luminous output; a control arrangement communicatively coupled to the dimmable lighting device including a controller adapted to adjust the luminous output of the lighting device and a communication module communicatively coupled to the controller.

The present invention further relates to a computer program product for a mobile communication device that configures the mobile can indication device to communicate with such a lighting arrangement.

The present invention yet further relates to a mobile communication device comprising such a computer program product.

The present invention still further relates to a lighting system comprising such a lighting arrangement and computer program product or mobile communication device.

BACKGROUND OF THE INVENTION

Intelligent lighting systems are becoming increasingly popular in a number of application domains. Such lighting systems typically comprise a lighting arrangement including one or more lighting devices under control of a control arrangement including one or more light sensors, in which the control arrangement is arranged to control the lighting devices in response to sensor data provided by the one or more light sensors such that a space in which the one or more lighting devices are located is illuminated in a desired manner, e.g. in accordance with predetermined user preferences.

Although this ensures the creation of desirable light conditions such as dimming levels and colour composition of the luminous output of the one or more lighting devices, it is not trivial to deliver optimal light conditions at each location within the space, such as a location that is relatively far removed from one of the sensors of the lighting system. This for instance can be problematic if a user in a certain location within the space seeks to perform a certain task at desired, i.e. optimal, illumination conditions. Where the actual illumination conditions in the certain location deviate from the optimal illumination conditions, the user may seek to manually adjust a lighting device predominantly responsible for illuminating the certain location. This for instance may be a lighting device arranged to illuminate a work space such as a desk at which the user is working. An example of such a lighting device is a desk lamp. Such manual adjustment defeats the object of an intelligent lighting system. Therefore, there exists a need for an automatic adjustment of a luminous output produced by a lighting device of such a lighting system in which the automatic adjustment targets the actual location where a particular lighting condition is desired.

SUMMARY OF THE INVENTION

The present invention seeks to provide a lighting arrangement configured to deliver a desirable lighting condition in a particular location.

The present invention further seeks to provide a computer program product for configuring a mobile communication device such that the mobile communication device can communicate with such a lighting arrangement in order to provide light measurements to the lighting arrangement that facilitate the lighting arrangement to deliver the desirable light condition in the location of the mobile communication device.

The present invention yet further seeks to provide a mobile communication device comprising such a computer program product.

The present invention still further seeks to provide a lighting system including such a lighting arrangement and computer program product or mobile communication device.

According to an aspect, there is provided a lighting arrangement comprising a lighting device having an adjustable luminous output; a control arrangement communicatively coupled to the dimmable lighting device including a controller adapted to adjust the luminous output of the lighting device, a data storage device accessible by the controller storing calibration data for a light measurement device of a mobile communication device, the calibration data being a function of a distance between the mobile communication device and the lighting device and a communication module communicatively coupled to the controller, wherein the control arrangement is adapted to control the lighting device such that the lighting device produces a predefined luminous output; receive a luminous output measurement from the mobile communication device at an unknown distance from the lighting device; retrieve distance information regarding the distance between the mobile communication device and the lighting device from the calibration data based on the received luminous output measurement; and adjust the luminous output of the lighting device with the controller in accordance with the retrieved distance information.

The lighting arrangement of the present invention is adapted to communicate with a known mobile communication device comprising a light measurement device such as a light sensor or camera, and use the light measurements provided by the light measurement device to configure the luminous output of the lighting device such that the luminous output at the location of the mobile communication device is the desired luminous output at that location, for instance to perform a certain task at that location under optimal light conditions. This is not a trivial solution, as light measurement devices in mobile communication devices such as smart phones and tablet computers are known to provide inaccurate light measurements, as such light measurements are typically dependent of the orientation of the light measurement device relative to the lighting device. This inaccuracy has been reduced by storing the distance-dependent calibration information for the light measurement device of the known mobile communication device on the control arrangement of the lighting device, which allows for an accurate calibration of the light measurements provided by the light measurement device.

The data storage device may store respective calibration data for a plurality of mobile communication devices having different light measurement devices, wherein the control arrangement is further adapted to receive mobile communication device identification information from the mobile communication device; identify the calibration data of the mobile communication device from the received mobile location device identification information; and retrieve distance information regarding the distance between the mobile communication device and the lighting device from the identified calibration data based on the received luminous output measurement. In this manner, different mobile communication devices may be used to communicate with a lighting arrangement, thus improving the flexibility of the lighting arrangement.

The control arrangement may be further adapted to receive an ambient light measurement from the mobile communication device, scaling the received luminous output measurement from the received ambient light measurement using the received ambient light measurement; and retrieve distance information regarding the distance between the mobile communication device and the lighting device from the calibration data based on the scaled luminous output measurement. This further improves the accuracy of the lighting arrangement.

The lighting device having an adjustable luminous output may be a dimmable lighting device, and the controller adapted to adjust the luminous output of the lighting device may be adapted to control a dimming level of the lighting device.

The lighting device may be a desk lamp although the present invention is not limited to such a lighting device.

The control arrangement may be integrated in the lighting device.

In an embodiment, the control arrangement is further adapted to calculate a difference between a desired luminous output and the actual luminous output at the location of the mobile communication device from the received luminous output measurement; and adjust the luminous output of the lighting device with the controller in accordance with the calculated difference in order to obtain the desired luminous output at the location of the mobile communication device.

In an embodiment, the control arrangement is further adapted to receive a user activity indication from a mobile communication device with the communication module; and determine the desired luminous output in accordance with the received user activity indication. In this manner, the luminous output of the lighting device may be optimized as a function of a particular user activity thus facilitating the provision of different optimal light conditions at the location of the mobile communication device.

The control arrangement may be further adapted to send a request to the mobile communication device for the luminous output measurement in response to controlling the lighting device such that the lighting device produces a predefined luminous output. This ensures that the mobile communication device performs the luminous output measurement at the appropriate point in time, i.e. after the adjustment of the luminous output of the lighting device to the predefined luminous output.

According to another aspect, there is provided a computer program product comprising a computer readable storage medium having computer readable program instructions embodied therewith for, when executed on a mobile communication device comprising a processor adapted to execute the computer readable program instructions, and further comprising a light measurement device and a mobile communication module under control of the processor, cause the processor to execute the steps of measuring a luminous output with the light measurement device; and transmitting the measured luminous output to the lighting arrangement of any of the above embodiments with the mobile communication module to facilitate the adjustment of the luminous output of the lighting device based on the luminous output measurement. Such a computer program product, e.g. an app stored on an app server or the like, may be used to configure a mobile communications device such as a smart phone or tablet computer to communicate with the aforementioned lighting arrangement such that the lighting arrangement can deliver desirable lighting conditions at the location of the mobile communications device.

The computer readable program instructions may include further instructions for, when executed on said processor, cause said processor to measure an ambient light condition with the light measurement device; and transmit the measured ambient light condition to the lighting arrangement with the mobile communication module in order to provide a lighting arrangement with a series of measurements from which the lighting device can be accurately controlled.

The computer readable program instructions may include further instructions for, when executed on said processor, cause said processor to execute the steps of receiving a user activity indication from a user interface of the mobile communication device; and sending the user activity indication to the lighting arrangement. This enables the mobile communication device to specify a particular user activity to the lighting arrangement, thereby facilitating the lighting arrangement to deliver optimal lighting condition for the specified particular user activity at the location of the mobile communication device.

The computer readable program instructions may include further instructions for, when executed on said processor, cause said processor to transmit mobile communication device identification information to the lighting arrangement with the mobile communication module. This information facilitates the lighting arrangement to select the appropriate calibration data for the mobile communication device.

According to yet another aspect, there is provided a mobile communication device comprising such a computer program product, a processor adapted to execute the computer readable program instructions of the computer program product, and further comprising a light measurement device and a mobile communication module under control of the processor. Such a mobile communication device can be used to communicate with the lighting arrangement in order to facilitate the lighting arrangements to deliver a desirable lighting condition at the location of the mobile communication device.

The light measurement device may be a light sensor or a camera although the present invention is not limited to a particular type of light measurement device.

The mobile communication device may be a smart phone or a tablet computer although the present invention is not limited to a particular type of mobile communication device.

According to still another aspect, there is provided a lighting system comprising the lighting arrangement and the computer program product or the mobile communication device of any of the above embodiments. Such a lighting system allows for the delivery of desired lighting conditions at any point within a space in which the lighting device is placed by placement of a mobile communication device configured with the computer program product at that point and providing the lighting arrangement with the two-point light measurement based on which the lighting arrangement can adjust the luminous output of the lighting device such that this luminous output corresponds to a desirable luminous output at that point.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
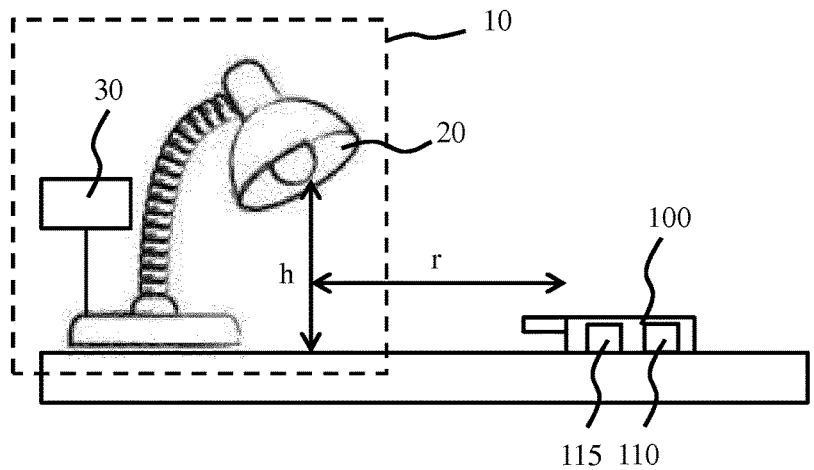
FIG. 1 schematically depicts a lighting system according to an embodiment.

It should be understood that the Figures are merely schematic and are not drawn to scale. It should also be understood that the same reference numerals are used throughout the Figures to indicate the same or similar parts.

Figure 2:
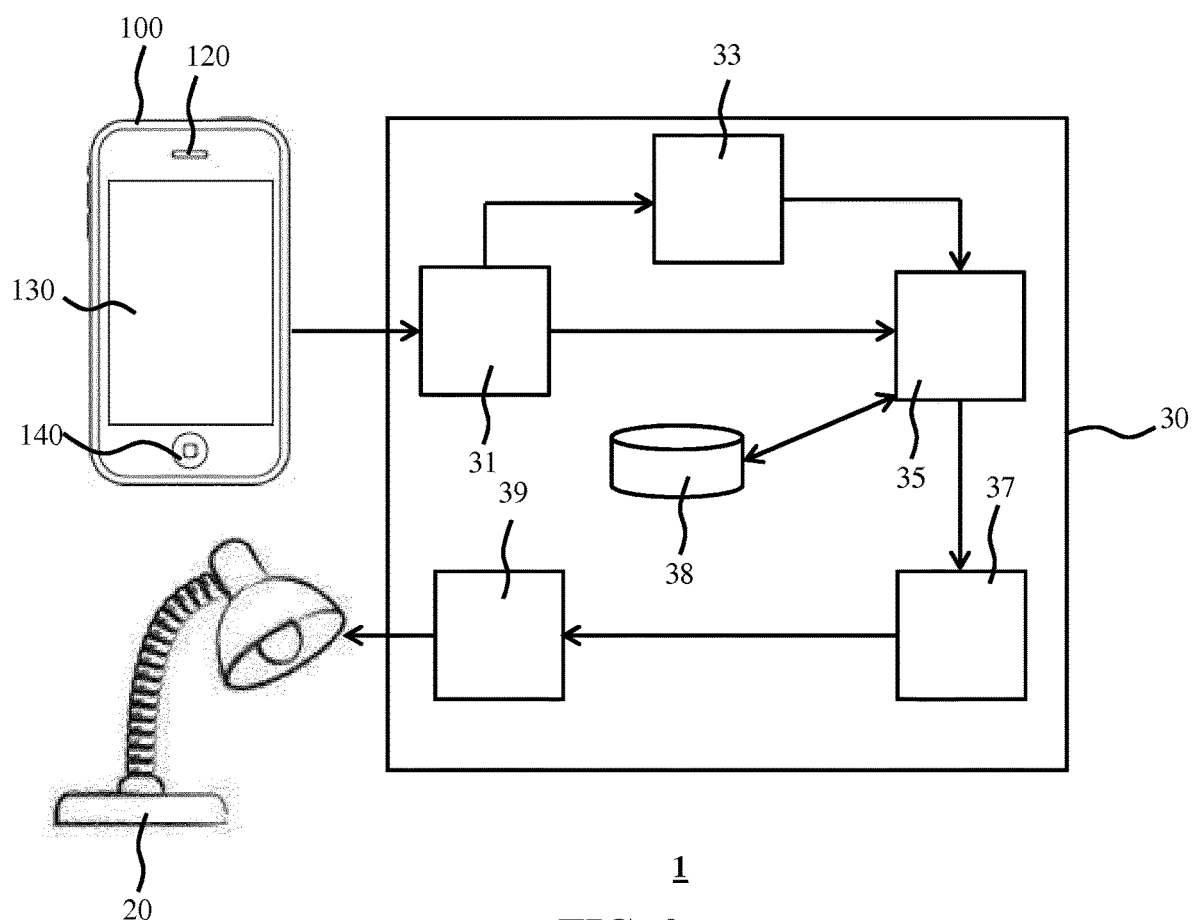
FIG. 2 schematically depicts an aspect of the lighting system of FIG. 1 in more detail.

FIG. 1 schematically depicts a lighting system 1 according to an embodiment, with FIG. 2 providing an alternative depiction of the lighting system 1 in which certain aspects of the lighting system 1 are shown in more detail. The lighting system 1 in this embodiment comprises a lighting arrangement 10 and a mobile communication device 100 comprising a computer program product that allows the mobile communication device 100 to communicate with the lighting arrangement 10. For example, the computer program product may be embodied by a data storage device within the mobile communication device 100 such as a memory device, a solid state data storage device, a magnetic data storage device, and so on. Alternatively, the lighting system 1 may comprise the computer program product for installation on a mobile communication device 100 already in the possession of a user of the lighting system 1. For example, the computer program product may come in the form of an app that can be downloaded from an app store or that may form part of a standard suite of apps, e.g. apps provided together with an operating system of the mobile communication device 100, already present on the mobile communication device 100.

The mobile communication device 100 typically comprises a processor 110 that is communicatively coupled to a mobile communication module 115 for wirelessly communicating with a third party, e.g. the lighting arrangement 10. Although reference is made to a single processor 110, it should be understood that the mobile communication device 100 may comprise multiple processors 110, which for the sake of simplicity are simply referred to as the processor 110 in the present application.

The mobile communication module 115 typically comprises a transceiver and an antenna for transmitting and receiving wireless communications in accordance with any suitable wireless communication standard such as UMTS, 3G, 4G, 5G or short-range communication standards including Wi-Fi, Bluetooth and NFC protocols. In a particularly advantageous embodiment, the mobile communication module 115 is adapted to communicate with the lighting arrangement 10 using a short-range communication protocol such as Wi-Fi or Bluetooth.

The mobile communication device 100 further comprises a light measurement device 120 in a communicative communication with the processor 110. The light measurement device 120 is typically adapted to measure a property of light such as spectral composition and preferably light intensity to which the mobile communication device 100 is exposed. The light measurement device 120 for example may be a light sensor or camera present in the mobile communication device 100 although it should be understood that embodiments of the light measurement device 120 are not limited thereto, any suitable light measurement device may be contemplated.

The mobile communication device 100 typically further comprises a display 130 under control of the processor 110, which may also be used as a user interface, for example as a touchscreen as is well-known per se. Any suitable touchscreen technology may be used for this purpose. The mobile communication device 100 may include further user interface elements under control of the processor 110 such as one or more buttons 140 or any other suitable type of user interface elements that facilitate the control of the mobile communication device 100. The mobile communication device 100 in some embodiments may be a smart phone or may be a tablet computer in some other embodiments although it should be understood that embodiments of the mobile communication device 100 are not limited thereto; any suitable mobile communication device 100 may be used.

The lighting arrangement 10 typically comprises one or more lighting devices 20 and a control arrangement 30 adapted to communicate with the mobile communication device 100 and to control the one or more lighting devices 20. Any suitable type of lighting device 20 may be used such as a lighting device 20 shaped to deliver a light beam of a certain degree of collimation to facilitate illumination of a workspace or the like. A non-limiting example of such a lighting device 20 is a desk lamp although other types of lighting devices are equally feasible. The lighting device 20 may have any suitable light source, e.g. an incandescent or halogen light bulb or solid state lighting elements such as LEDs, preferably dimmable LEDs. LEDs are particularly preferred as they facilitate several degrees of control of the luminous output of the lighting device 20, such as dimming in case of dimmable LEDs and colour adjustment in case of a lighting device 20 comprising multiple LEDs each producing a different output in terms of spectral composition such that the overall spectral composition of the luminous output of the lighting device 20 may be controlled by individual control of these LEDs.

The control arrangement 30 may comprise one or more discrete hardware components such as a processor or microcontroller, a communication module, and so on, which will be described in more detail below. At this point, it is noted that the control arrangement 30 may be a control arrangement separate to the lighting device 20 and connected to the lighting device 20 in a wired or wireless manner or alternatively may be a control arrangement integral to the lighting device 20 such that the lighting device 20 provides a stand-alone lighting arrangement 10.

In embodiments of the present invention, the mobile communication device 100 may be used by its user as a calibration device for the lighting device 20 of the lighting arrangement 10 to ensure that a desirable lighting condition is generated at of the location of the user. This location typically is a stationary location and may be a location in which the user is performing a particular task, such as reading, writing, a manual task, TV or computer monitor watching, and so on. Such tasks typically require a particular lighting condition to allow the user to perform the task in a comfortable manner, e.g. without squinting or the like because of imperfect lighting conditions. Such desired lighting conditions for example may include at least one of light having a particular spectral composition, e.g. light of a particular colour, white light of a particular colour temperature, a particular light level or intensity, and so on. Such a desired lighting condition may be predefined or may be user-defined.

To this end, the user may place the mobile communication device 100 on a surface or another suitable resting place for the mobile communication device 100 in the location in which the user is planning to perform the particular task and instruct the mobile communication device 100, for example through interaction with a user interface of the mobile communication device 100, to perform a light measurement with the light measurement device 120 and communicate the light measurement to the lighting arrangement 10 through its mobile communication module 115 under control of the processor 110 in order to facilitate the control arrangement 30 of the lighting arrangement 10 to control the lighting device 20 in accordance with the provided light measurement, for instance by determining a deviation from a desired lighting condition at the location of the light measurement and adjusting the lighting device 20 in accordance with the determined deviation, e.g. adjusting a dimming level and/or a colour or colour temperature output of the lighting device 20. The mobile communication device 100 preferably should be placed in a predefined orientation, e.g. on a flat surface, such that the orientation of the light measurement device 120 becomes dependent on the distance r only, in order to improve the accuracy of the control of the lighting device 20.

Figure 3:
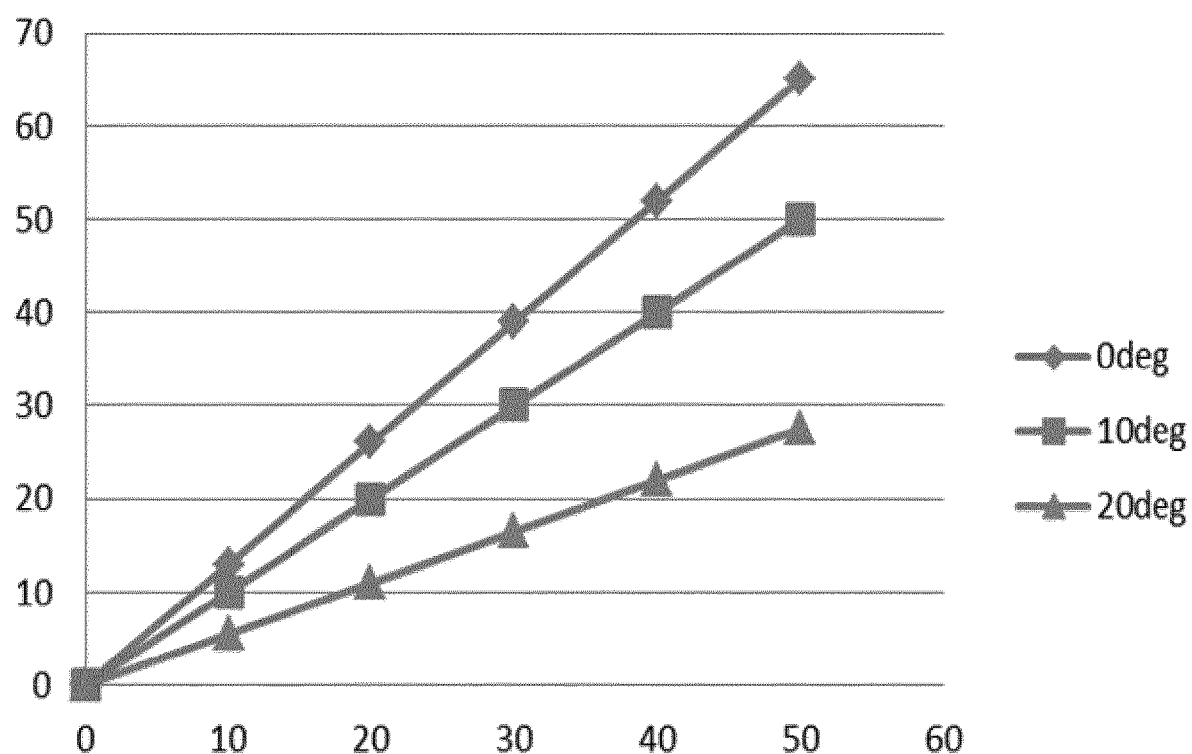
FIG. 3 depicts a typical light sensor response of a smart phone.

It is noted that the light measurement provided by the light measurement device 120 can exhibit large variations resulting from a particular orientation of the light measurement device 120 relative to the lighting device 20, such that it is far from trivial to accurately adjust the luminous output of the lighting device 20 based on a light measurement provided by the light measurement device 120 of the mobile communication device 100. This is explained in more detail with the aid of FIG. 3, which schematically depicts an actual light intensity (x-axis) produced by a lighting device 20 and a measured light intensity (y-axis) by a light measurement device 120 of a mobile communication device 100 as a function of the angle between an optical axis of the light measurement device 120 and an approximated point source of the luminous output produced by the lighting device 20. As can be seen in FIG. 3, the measured light intensity decreases with increasing angle of incidence of the light produced by the lighting device 20. This effect is further exacerbated by the fact that the integration of the light measurement device 120 in the housing of the mobile communication device 100 typically reduces the aiming angle of the light measurement device 120 to a cone angle of approximately 30°, such that light incident under larger angles is not (effectively) picked up or detected by the light measurement device 120. In addition, light measurements provided by light measurement devices 120 in different mobile communication devices 100 can produce rather different light measurement results for identical light conditions, which further complicates the control of a lighting device 20 using a mobile communication device 100.

Embodiments of the present invention are based on the insight that the lighting arrangement 10 may be configured to include calibration data for a light measurement device of a particular mobile communication device, the calibration data being a function of a distance between the mobile communication device and the lighting device, such that when the mobile communication device 100 is placed in a certain (unknown) location relative to the lighting device 20 in order to provide a light measurement to the control arrangement 30 of the lighting device 20, the position or orientation of the mobile communication device 100 may be derived from a light measurement in which the mobile communication device 100 is exposed to a predetermined luminous output of the lighting device 20 under control of the controller 39. This can be understood with the aid of FIG. 1, from which it is clear that the angle of incidence θ of light entering the light measurement device 120 is a function of the height h of the light source of the lighting device 20 above the resting surface of the mobile communication device 100 and the distance r of the mobile communication device 100 from the lighting device 20, i.e. tan (θ)=r/h.

Figure 4:
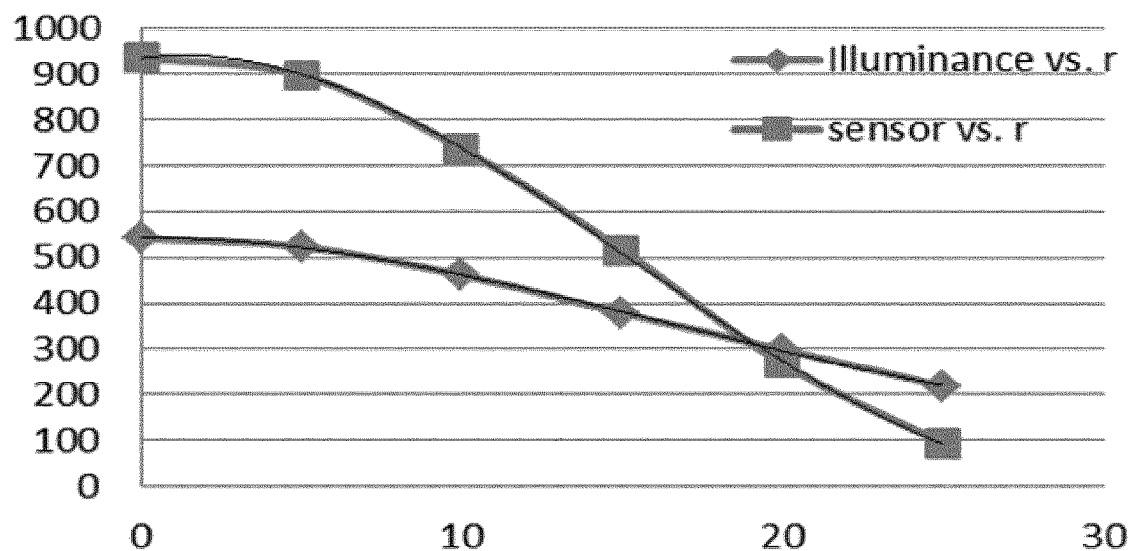
FIG. 4 depicts a typical response function of a light sensor response of a smart phone against a typical luminous intensity decay function as a function of distance from a lighting device.

FIG. 4 schematically depicts a typical response function of a light measurement device 120 of a mobile communication device 100 and a typical decay function of luminous intensity as a function of a distance from the light engine of the lighting device 20. As can be seen from FIG. 4, the difference between the actual luminous level and the luminous measurement provided by the light measurement device 120 is dependent of the actual distance of the mobile communication device 100 from the lighting device 20 for a given height difference h. It can be understood from FIG. 4 that for a given luminous output, here a light intensity of about 550 lux, the light measurement device 120 exhibits a unique response as a function of the distance r of the mobile communication device 100 from the lighting device 20. Therefore, as long as the response function, i.e. calibration information, of the light measurement device 120 in the mobile communication device 100 is known for a predetermined luminous output of the lighting device 20, the distance of the mobile communication device 100 from the lighting device 20 may be determined by the control arrangement 30 of the lighting arrangement 10 based on the light measurement provided by the light measurement device 120 by generating a predetermined luminous output with the lighting device 20, receiving a light measurement from the light measurement device 120 and looking up the distance between the mobile communication device 100 and the lighting device 20 associated with this light measurement value in this calibration information stored within the control arrangement 30.

Such a calibration function may be created by exposing a particular mobile communication device 100 to a series of varying luminous conditions at various distances from the lighting device 20. This may be done during manufacturing of the lighting arrangement 10, alternatively, a user of the lighting arrangement 10 may calibrate the lighting arrangement 10 with a particular mobile communication device 100 by placement of the mobile communication device 100 at a series of predefined distances from the lighting device 20 and exposing the mobile communication device 100 to a series of varying luminous outputs produced by the lighting device 20.

In an embodiment, the control arrangement 30 may store a plurality of such calibration functions, with each calibration function relating to a particular mobile communication device such that the luminous output of the lighting device 20 may be controlled using different types of mobile communication devices, i.e. different mobile communication devices that are known to the lighting arrangement 10. In such an embodiment, the mobile communication device 100 may be configured, e.g. using a suitably configured computer program product, to transmit mobile communication device identification information to the lighting arrangement 30 via its mobile communication device 115 to allow the control arrangement 30 to identify the mobile communication device 100 from the transmitted identification information such that the control arrangement 30 can refer to the appropriate calibration information for the identified mobile communication device 100.

Figure 6:
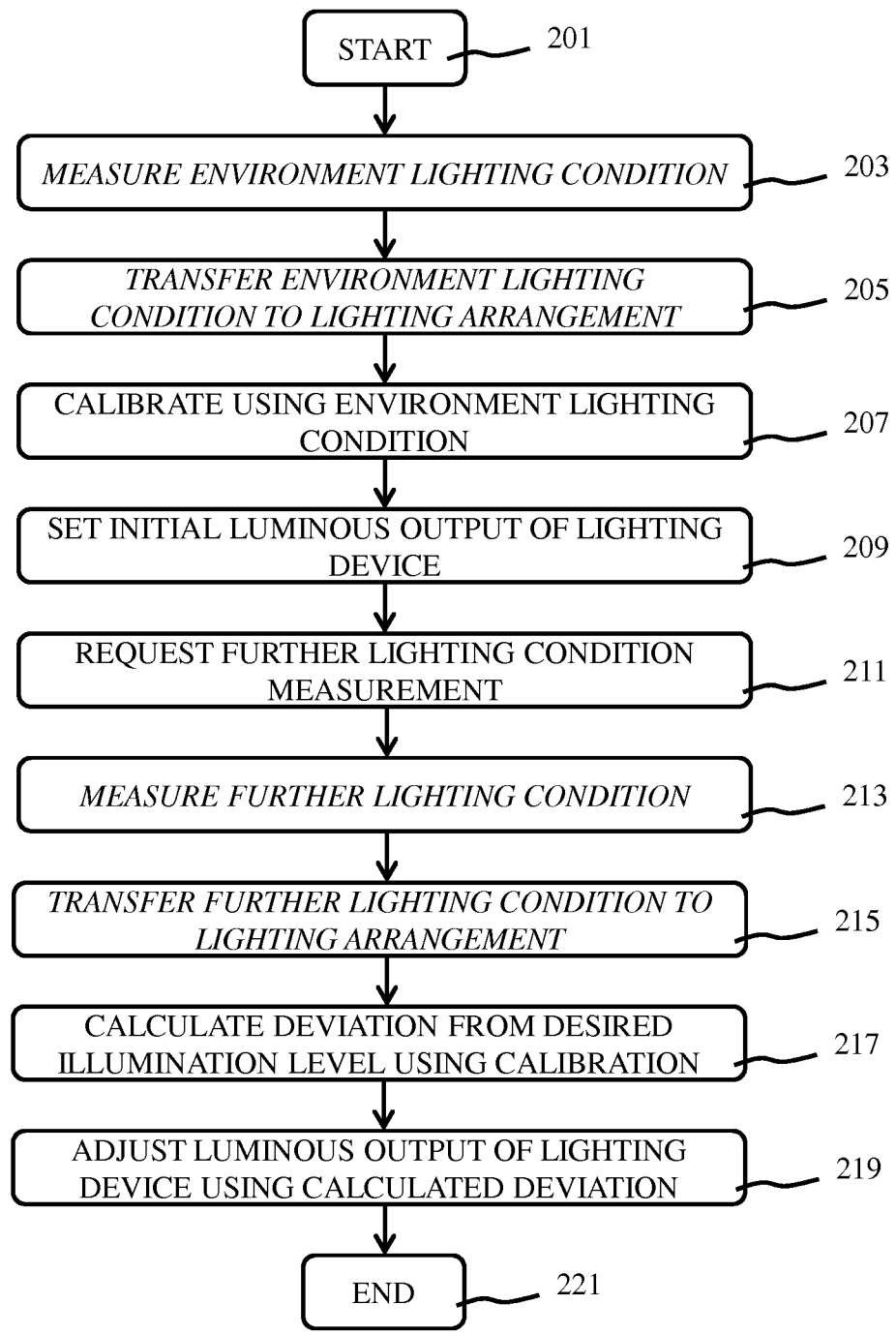
FIG. 6 schematically depicts an operating method of a lighting system according to an embodiment.

An example embodiment of the present invention will be explained in more detail with the aid of FIG. 6, which is a flowchart of a method 200 of controlling a lighting device 20 of a lighting arrangement 10 according to an embodiment implemented by the lighting system 1. The method 200 may start in 201, for example enabling the lighting arrangement 10, and optionally by a mobile communication device 100 providing an indication to the control arrangement 30 that a particular lighting condition is required at the location of the mobile communication device 100. For example, a user of the mobile communication device 100 may interact with the computer program product adapted to interact with the lighting arrangement 10 by selecting a particular user activity to be performed by the user of the mobile communication device 100 using a user interface such as a touchscreen display 130 of the mobile communication device 100, which selection triggers the processor 110 to control the mobile communication module 115 to communicate the selected user activity to the lighting arrangement 10.

In optional step 203, the mobile communication device 100 performs a first light measurement with the light measurement device 120 and communicates the first light measurement to the control arrangement 30 with the mobile communication module 115 in 205. The first light measurement may be a light measurement of ambient lighting conditions, e.g. natural lighting conditions, experienced by the mobile communication device 100 in a certain location or alternatively may be a light measurement of a lighting condition created by the lighting device 20 in an initial setting selected by the control arrangement 30. It should be understood that this step may be omitted as will be explained in more detail later.

The control arrangement 30 typically comprises a communication module 31 for communicating with the mobile communication module 115. The communication module 31 may be a module for directly communicating with the mobile communication module 115, e.g. comprise a transceiver and aerial for wireless communication with the mobile communication module 115 using a wireless communication protocol as previously explained. Alternatively, the communication module 31 may be a module for indirectly communicating with the mobile communication module 115, for example may be a network interface connected to a wired or wireless network hub, bridge, router or the like and arranged to communicate with the mobile communication module 115 through this hub, bridge, router or the like. The wired or wireless network hub, bridge, router or the like may form part of the lighting system 1 or may be separate therefrom.

In an embodiment, the control arrangement 30 further comprises a calibration module 33 communicatively coupled to the communication module 31 and adapted to determine a first illuminance value from the optional first light measurement received from the mobile communication device 100 by the communication module 31 in 207 based on the value of the first light measurement Vs made with the light measurement device 120, which is a function of the illuminance Es at position P of the mobile communication device 100 at a certain angle θ towards the light engine of the lighting device 20 as previously explained:

$$Vs(\theta, dl, P) = f(\theta) \times Es(dl, P) = f(r, h) \times Es(dl, P) \quad (1)$$

In this equation, $f(\theta)$ is the aforementioned response function of the light measurement device 120. As mentioned above and expressed in Equation (1), Vs is a function of the distance r of the light measurement device 120 to the light engine of the lighting device 20, the predefined luminous output, e.g. a predefined dimming level dl of the lighting device 20, and the position P in which the light measurement device 120 receives the light from this light engine, which the distance r is dependent on the angle θ as can be readily understood from FIG. 1. However, when the lighting device 20 is positioned in a predefined manner, i.e. has a known height h and orientation relative to the certain location of the mobile communication device 100 therefore P becomes directly proportional to r, the following equations may be assumed:

$$E = Ed(dl, r) + Eb \quad (2)$$

$$V = Vd(dl, r) + Vb \quad (3)$$

wherein V is the measurement value produced by the light measurement device 120 and E is the actual illuminance in a certain location of the mobile communication device 100, Eb, Vb are the ambient or natural light components and Ed and Vd are the artificial or lighting device 20 generated components of the measurement value produced by the light measurement device 120. It should be understood that Eb and Vb may be assumed to be negligible, for instance under lighting conditions dominated by the luminous output of the lighting device 20, in which the determination of the contribution of the ambient light to the overall lighting conditions may be ignored.

In embodiments in which an initial light measurement is performed with the light measurement device 120 in order to establish ambient lighting conditions, the lighting device 20 may be switched off such that the light measurement device 120 only detects ambient light. In order to calibrate the output Vb of the light measurement device 120 in order to determine the actual ambient lighting condition Eb, the calibration module 33 may apply a calibration factor K to the measured ambient lighting condition Vb in accordance with the following equation:

$$Eb = K \times Vb \quad (4)$$

The calibration factor K may be a predetermined factor based on a certain time of day, a certain time of the year, or combinations thereof. For example, during daylight conditions, the calibration factor K may be a scaling factor ranging from 2.0-2.8, whereas during night time, the calibration factor K may be a scaling factor ranging from 1.0 to 1.8. Other scaling factors may be used, such as empirically determined scaling factors for a lighting measurement device 120 of a particular mobile communication device 100. It is noted that ambient lighting conditions may be assumed substantially constant throughout an enclosed space in which the lighting device 20 is placed, i.e. independent of the distance r between the mobile communication device 100 and the lighting device 20, such that ambient light measurements may be calibrated using the same calibration factor K regardless of the actual location of the mobile communication device 100 relative to the lighting device 20.

Where an ambient light measurement has been performed with the light measurement device 120, the calibration module 33 may transfer the calibrated first luminous output measurement to a positioning module 35 adapted to calculate the distance r (or orientation angle θ) of the mobile communication device 100 from the lighting device 20 in order to include the contribution of the ambient light to the overall luminous conditions, as expressed by Equations 2 and 3, as will be explained in more detail later. The ambient light measurement typically is temporarily retained by the control arrangement 30, e.g. temporarily stored in data storage device 38, such as for the duration of the adjustment protocol of the lighting device 20 as for any other suitable period of time.

In 209, controller 39 of the lighting device 20 may control the lighting device 20 to produce a predetermined luminous output, e.g. a luminous output at an initial dimming level, a luminous output at an initial spectral composition, the luminous output at an initial dimming level with an initial spectral composition, and so on, in order to create a known artificial component to the light conditions at the unknown location of the mobile communication device 100.

At this stage, the mobile communication device 100 may be requested in 211 to perform a (further) light measurement with the light measurement device 120 in order to capture the adjusted lighting conditions at the unknown location of the mobile communication device 100 caused by the lighting device 20 producing the predetermined luminous output. Such a request for instance may be forwarded to the mobile communication module 115 of the mobile communication device 100 by the communication module 31 of the control arrangement 30, e.g. under the control of the controller 39. Alternatively, the mobile communication device 100 may detect a change in the lighting conditions measured with the light measurement device 120 caused by the lighting device 20 producing the predetermined luminous output, which detected change may trigger the mobile communication device to automatically perform a (further) light measurement with the light measurement device 120.

The light measurement device 120 of the mobile communication device 100 subsequently measures the altered lighting condition in 213 and communicates the subsequent light measurement V to the communication module 31 of the control arrangement 30 with the mobile communication module 115 in 215, which communication module 31 forwards the received subsequent measurement to the positioning module 35. Based on the stored calibration information for the mobile can indication device 100 in data storage device 38, the positioning module 35 calculates r (and therefore θ due to the predefined orientation of the mobile communication device 100) for the unknown location of the mobile communication device 100 from the luminous output measurement performed with the light measurement device 120 of the predefined luminous output of the lighting device 20 and the optional ambient light measurement performed with the light measurement device 120, for example using the above equations (1)-(3) or equivalent equations as will be apparent to the skilled person. For example, the positioning module 35 may employ an algorithm based on the insight that since both E and V are monotonic with r, the following reverse function M applies for the known initial luminous output setting of the lighting device 20, e.g. a known dimming level dl0:

$$r=M(Vd(dl0))=M(V-Vb) \quad (5)$$

This facilitates the calculation of the artificial illuminance Ed=Ed(dl0,r). The thus obtained positional information (and artificial illuminance contribution at the determined position of the mobile communication device 100) may be forwarded by the positioning module 35 to a computing module 37 adapted to calculate the required luminous output for the lighting device 20 in order to achieve a desired luminous output at the actual location of the mobile communication device 100, i.e. at the distance r from the lighting device 20.

In an embodiment, the computing module 37 may calculate in 217 a deviation from a desired lighting condition in the determined position by the positioning module 35, for example by comparing the actual lighting condition derived from the one or more measurements provided by the light measurement device 120 to the target lighting condition in order to facilitate the controller 39 to generate an updated control signal in 219 for the lighting device 20 that reduces this deviation, thereby providing a user in the location of the mobile communication device 100 with a suitable lighting condition for performing a particular task. Alternatively, the computing module 37 may simply look up the required luminous output of the lighting device 20 in order to achieve the desired luminous output in the location of the mobile communication device 100, e.g. by accessing a suitably configured look up table. This for instance is feasible where the contribution of ambient lighting conditions to the overall lighting condition in the location of the mobile communication device 100 is negligible.

In an embodiment, the computing module 37 may be adapted to calculate a modification or scaling factor MF to be translated into a control signal to be applied to the initial settings of the lighting device 20, which modification or scaling factor is intended to reduce or cancel the deviation of the actual lighting condition at the location of the mobile communication device 100 from the desired lighting condition Et at that location:

$$MF=(Et-Eb)/Ed(dl0,r) \quad (6)$$

The modification or scaling factor MF for the luminous output of the lighting device 20 in some embodiments is a monotonic function of its luminous output such as a dimming level dl. For example, a desired dimming level control signal dl may be determined by the following equation:

$$dl=G(MF) \quad (7)$$

Figure 5:
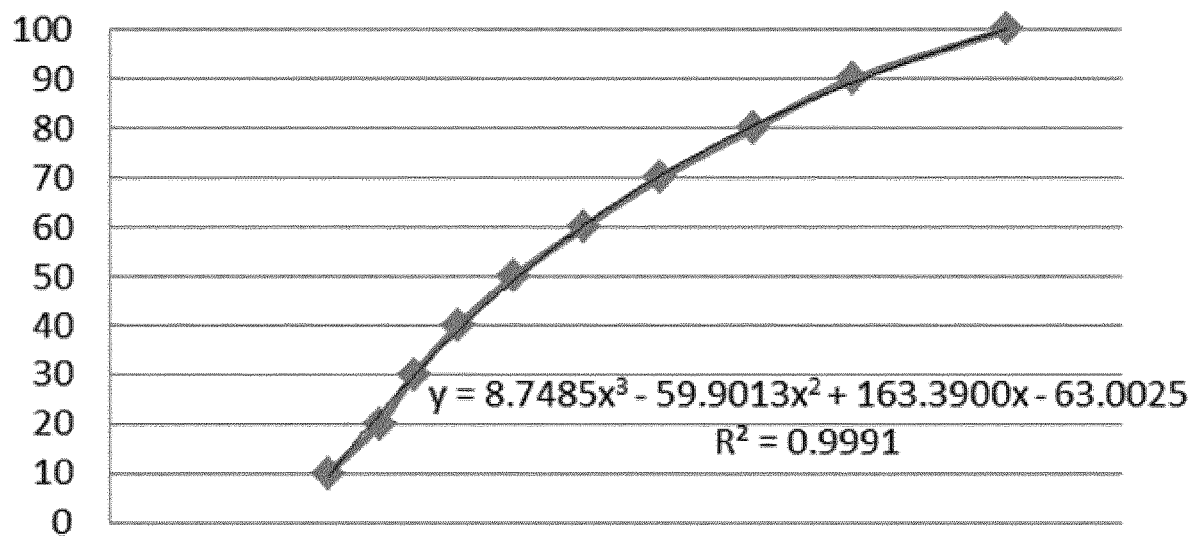
FIG. 5 depicts an aspect of an example calibration function for a known mobile communication device.

In Equation (7), G is a monotonic function based on the calibration data of the light measurement device 120 of the known mobile communication device 100 and the luminous characteristics of the lighting device 20. FIG. 5 schematically depicts an example of a monotonic function G in which the scaling factor MF is a function of a dimming level of the lighting device 20.

The control arrangement 30 may comprise predetermined desired lighting conditions for specific tasks and/or tasks to be performed at a particular distance from the lighting device 20, e.g. a distance of the mobile communication device 100 from the light engine of the lighting device 20 as determined by the positioning module 35. Such predetermined desired lighting conditions may be stored in any suitable form, e.g. a lookup table, database or the like accessible to the computing module 37. Alternatively, the predetermined desired lighting conditions may be included in an algorithm to be executed by the computing module 37.

In an embodiment where the predetermined desired lighting conditions comprises a plurality of desired lighting conditions, with individual desired lighting conditions belonging to a particular task to be performed by a user at the location of the mobile communication device 100, the lighting device 20 may include a user interface allowing the specification of a particular task to be performed. Any suitable user interface, e.g. a set of buttons, a dial, a touchscreen display, and so on may be used for this purpose. The computing module 37 may be controlled by this user interface such that a specification of a particular task to be performed on the user interface triggers the computing module 37 to select the appropriate individual desired lighting condition from the plurality of desired lighting conditions.

Alternatively, the computer program product embodied by the mobile communication device 100 may facilitate the specification of the particular task to be performed on a user interface of the mobile communication device 100, which specified particular task may be communicated to the control arrangement 30 by the mobile location module 115, with the computing module being responsive to this communication.

At this point, it is noted that the control arrangement 30 of the lighting arrangement 10 of the lighting system 1 may be realized in any suitable manner. Although the functionality of embodiments of the control arrangement 30 has been explained in terms of various discrete modules, it should be understood that this is by way of non-limiting examples only and that at least some of these discrete modules may not exist as separate entities, but instead may be functions implemented in software by one or more (micro-)processors or (micro-) controllers of the control arrangement 30.

In an example embodiment, the control arrangement 30 comprises a communication module 31 and a controller 39 as discrete hardware components, with the controller 39 comprising a processor for implementing the various modules of the control arrangement 30 explained above. In an alternative example embodiment, the control arrangement 30 comprises a communication module 31, a controller 39 and a separate processor as discrete hardware components, with the separate processor implementing the various modules of the control arrangement 30 explained above. Many other suitable hardware implementations of the control arrangement 30 will be immediately apparent to the skilled person, and each of these suitable alternative implementations may be used without departing from the teachings of the present invention.

It should furthermore be understood that not every (functional) module of the control arrangement 30 is necessarily present in every embodiment of the lighting arrangement 10 and lighting system 1 of the present invention. For example, the positioning module 35 may be omitted in embodiments where the actual position of the mobile communication device 100 is not relevant. This for example applies to embodiments in which a user wishes to perform a task at a particular lighting condition, which particular lighting condition is independent of the distance from the lighting device 20 at which the task is performed. In this scenario, it may be sufficient to simply determine the calibration factor K for the light measurement device 120 of the mobile communication device 100 and adjust the initial luminous output setting of the lighting device 20 based on the subsequent measurement performed with the light measurement device 120 by calculation of the artificial illuminance $E_d=E_d(d_0,r)$ only, using the calibration factor K.

In the above embodiments, the control of the lighting device 20 in order to achieve a desired lighting condition in a location of the mobile communication device 100 is based on a single-point or two-point light measurement with the light measurement device 120 by way of non-limiting examples only. The calibration of the luminous output of the lighting device 20 may be based on any N-point measurement protocol with the light measurement device 120, wherein N is an integer having a value of at least two, e.g. N=2, 3, 4, and so on. In this manner, the deviation of the actual lighting condition in the location of the mobile communication device 100 from a desired lighting condition may be systematically reduced, e.g. in a self-consistent manner.

Aspects of the present invention may be embodied as a lighting arrangement, computer program product, mobile communication device comprising such a computer program product and lighting system comprising such a lighting arrangement and the computer program product or mobile communication device. Aspects of the present invention may take the form of a computer program product embodied in one or more computer-readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Such a system, apparatus or device may be accessible over any suitable network connection; for instance, the system, apparatus or device may be accessible over a network for retrieval of the computer readable program code over the network. Such a network may for instance be the Internet, a mobile communications network or the like. More specific examples (a non-exhaustive list) of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present application, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out the methods of the present invention by execution on the processor 110 may be written in any combination of one or more programming languages, including an object oriented programming language such as Java, Smalltalk, C++ or the like and conventional procedural programming languages, such as the "C" programming language or similar programming languages. The program code may execute entirely on the processor 110 as a stand-alone software package, e.g. an app, or may be executed partly on the processor 110 and partly on a remote server. In the latter scenario, the remote server may be connected to the mobile communication device 100 through any type of network, including a local area network (LAN) or a wide area network (WAN), or the connection may be made to an external computer, e.g. through the Internet using an Internet Service Provider.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions to be executed in whole or in part on the processor 110 of the mobile communication device 100, such that the instructions create means for implementing the functions/acts specified in the flowchart and/or block diagram block or blocks. These computer program instructions may also be stored in a computer-readable medium that can direct the mobile communication device 100 to function in a particular manner.

The computer program instructions may be loaded onto the processor 110 to cause a series of operational steps to be performed on the processor 110, to produce a computer-implemented process such that the instructions which execute on the processor 110 provide processes for implementing the functions/acts specified in the flowchart and/or block diagram block or blocks. The computer program product may form part of a computing device, e.g. may be installed on the mobile communication device 100.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A lighting arrangement comprising:
a lighting device having an adjustable luminous output;
a control arrangement communicatively coupled to the lighting device, the control arrangement including a controller adapted to adjust the luminous output of the lighting device, a data storage device accessible by the controller storing calibration data for a light measurement device of a mobile communication device, the calibration data being a function of a distance between the mobile communication device and the lighting device, a function of a height of the lighting device, and a function of an orientation of the mobile communication device with respect to the lighting device, and a communication module communicatively coupled to the controller, wherein the control arrangement is adapted to:
control the lighting device such that the lighting device produces a predefined luminous output;
receive a luminous output measurement from the mobile communication device at the distance and the orientation with respect to the lighting device;
retrieve distance information regarding the distance between the mobile communication device and the lighting device from the calibration data based on the received luminous output measurement;
retrieve height information regarding the height of the mobile communication device with respect to the lighting device based on the received luminous output measurement;
retrieve orientation information regarding the orientation of the mobile communication device with respect to the lighting device based on the received luminous output measurement;
calculate a difference between a desired luminous output and the measured luminous output at the location of the mobile communication device from the received luminous output measurement, wherein the desired luminous output is a brightness of the lighting device; and
adjust the luminous output of the lighting device with the controller in accordance with the calculated different based on the retrieved distance information, the retrieved height information, and the retrieved orientation information.

2. The lighting arrangement of claim 1, wherein the data storage device stores the calibration data for the mobile communication device having the light measurement device, wherein the control arrangement is further adapted to:
receive mobile communication device identification information from the mobile communication device;
identify the calibration data of the mobile communication device from the received mobile location device identification information; and
retrieve distance information regarding the distance between the mobile communication device and the lighting device from the identified calibration data based on the received luminous output measurement.

3. The lighting arrangement of claim 1, wherein the control arrangement is further adapted to:
receive an ambient light measurement from the mobile communication device;
scaling the received luminous output measurement from the received ambient light measurement using the received ambient light measurement; and
retrieve distance information regarding the distance between the mobile communication device and the lighting device from the calibration data based on the scaled luminous output measurement.

4. The lighting arrangement of claim 1, wherein the lighting device having an adjustable luminous output is a dimmable lighting device, and the controller adapted to adjust the luminous output of the lighting device in accordance with the retrieved distance information is adapted to control a dimming level of the lighting device.

5. The lighting arrangement of claim 1, wherein the control arrangement is integrated in the lighting device.

6. The lighting arrangement of claim 1, wherein the control arrangement is further adapted to send a request to the mobile communication device for the luminous output measurement in response to controlling the lighting device such that the lighting device produces a predefined luminous output.

7. The lighting arrangement of claim 1, wherein the control arrangement is further adapted to: receive a user activity indication from a mobile communication device with the communication module; and determine the desired luminous output in accordance with the received user activity indication.

8. A computer program product comprising a non-transitory computer readable storage medium having computer readable program instructions embodied therewith for, when executed on a mobile communication device comprising a processor adapted to execute the computer readable program instructions, and further comprising a light measurement device and a mobile communication module under control of the processor, cause the processor to execute the steps of:

measuring a luminous output with the light measurement device at a distance and a height with respect to a lighting arrangement;

calculating a difference between a desired luminous output and the measured luminous output at a location of the mobile communication device wherein the desired luminous output is a brightness of the lighting arrangement; and transmitting the measured luminous output to the lighting arrangement with the mobile communication module to facilitate the adjustment of the luminous output of a lighting device of the lighting arrangement based on the luminous output measurement measured at the first distance, the calculated difference, and calibration data, where the calibration data is a function of the distance between the mobile communication device and the lighting device, the height of the lighting device with respect to the mobile communication device, and an orientation of the mobile communication device with respect to the lighting device.

9. The computer program product of claim 8, wherein the computer readable program instructions include further instructions for, when executed on said processor, cause said processor to execute the steps of:

measuring an ambient light condition with the light measurement device; and transmitting the measured ambient light condition to the lighting arrangement with the mobile communication module.

10. The computer program product of claim 8, wherein the computer readable program instructions include further instructions for, when executed on said processor, cause said processor to execute the steps of:

receiving a user activity indication from a user interface of the mobile communication device; and sending the user activity indication to the lighting arrangement.

11. The computer program product of claim 8, wherein the computer readable program instructions include further instructions for, when executed on said processor, cause said processor to transmit mobile communication device identification information to the lighting arrangement.

12. The mobile communication device of claim 8, wherein the mobile communication device is a smart phone or a tablet computer.

13. A lighting system comprising the lighting arrangement of claim 1.

* * * * *